April 9, 1963

T. D. BAXTER 3,084,800

INDUSTRIAL FILTER HEAD

Filed Nov. 20, 1958

INVENTOR
Thomas D. Baxter

BY
Mead, Browne, Schuyler & Beveridge
ATTORNEYS

INVENTOR
Thomas D. Baxter

United States Patent Office 3,084,800
Patented Apr. 9, 1963

3,084,800
INDUSTRIAL FILTER HEAD
Thomas D. Baxter, East Petersburg, Pa., assignor to Baxter Filtration Corporation, Lancaster, Pa., a corporation of Pennsylvania
Filed Nov. 20, 1958, Ser. No. 775,268
15 Claims. (Cl. 210—232)

This invention relates to industrial filter heads, and more particularly to a filter head assembly especially constructed to permit rapid replacement or reconditioning of its filter element.

Industrial filters employed in processes in which suspended solids are removed from slurries must be periodically closed down to remove the solid particles or cake which collects upon the filter element. During the filtering process, the cake which forms on the filter element builds up as the process is continued and as the cake builds up the filtering efficiency of the filter element is reduced. The construction of most prior art filter heads is such that replacement or reconditioning of the filter element requires the filtering system to be shut down for a substantial period of time. Since the filter assembly is non-productive during the cleaning operation, the usual practice finds an excess number of filter heads being employed so that a steady output may be maintained while a certain number of heads are shut down for cleaning or replacement of their filter elements.

As an outgrowth of this type of operation, the usual practice finds each filter head being operated either for a given period of time or for a period necessary to produce a given amount of filtrate. This practice frequently finds the filter element operating at extremely low efficiencies toward the end of its period of operation. This is justified because such a substantial period of non-productive time is required to recondition the filter element it is considered more practical to operate the filter at a low efficiency than to shut it down.

From the foregoing, it is seen that because of the substantial length of time to replace or recondition filtering elements mounted in prior art filter heads the overall efficiency of the system is decreased due to the necessity for operating the filtering elements at low filtering efficiencies. Because of the substantial period of shut down time required to recondition or replace a filter element, extra filter heads must be provided to maintain production while a portion of the filter heads within the system are shut down for cleaning.

Accordingly, it is a primary object of this invention to provide a filter head assembly permitting rapid replacement or reconditioning of the filter element.

A further object of the invention is to provide a filter head assembly in which shut down time for cleaning or replacement of the filter element is reduced to a minimum.

Still another object of the invention is to provide mechanism for rapidly opening and closing a filter head assembly to permit shifting, replacing or reconditioning of the filter element.

Still another object is to provide a relatively simple and positive acting mechanism and maintaining the head assembly in the closed position.

In the achievement of these and other objects, the filter head assembly of the present invention includes a pair of mating filter head elements mounted for movement between an open position wherein the elements are spaced from each other and a closed position wherein the elements are disposed in mating engagement to cooperatively define an enclosed filtering chamber. A pneumatically operated cam mechanism is employed to drive the head elements into the closed position, while a spring system is arranged to continuously bias the elements to the open position.

Other features and advantages of the invention will become apparent from the following specification taken in conjunction with the accompanying drawings.

Figure 1:
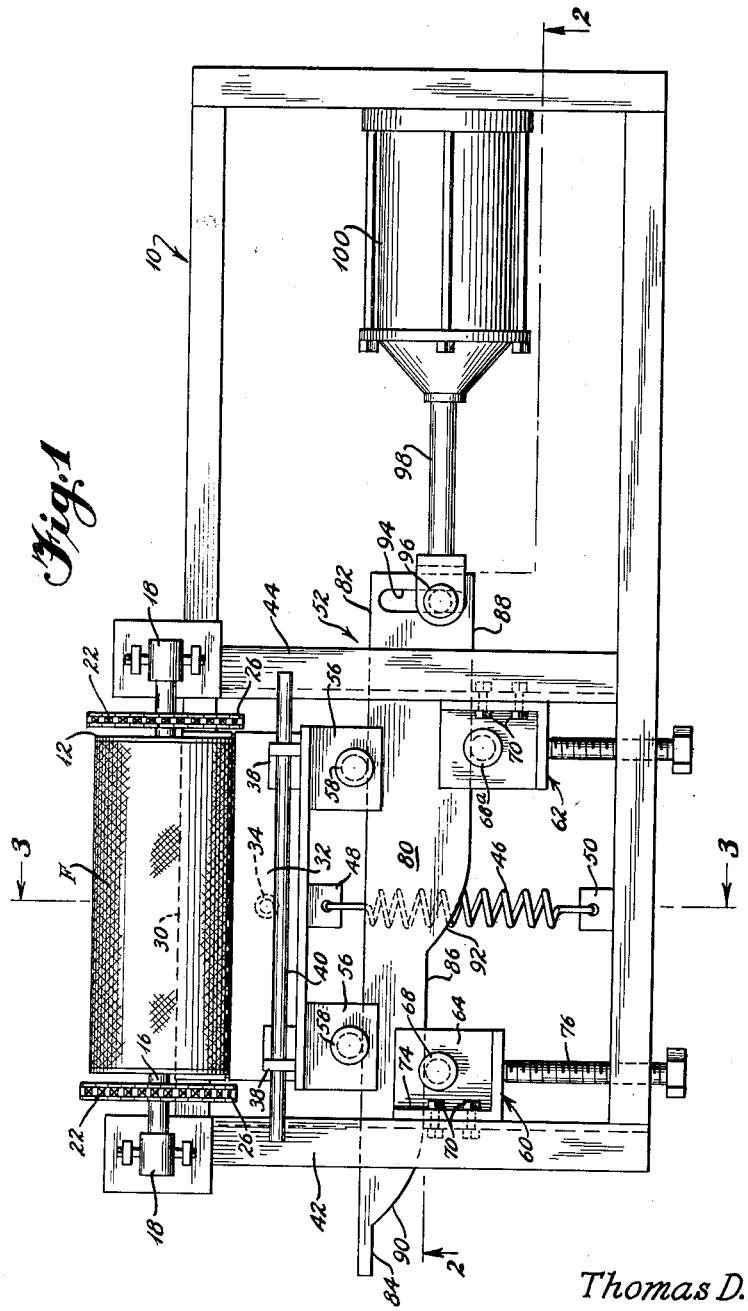
FIG. 1 is a plan view of a filter head assembly embodying the present invention.
Figure 2:
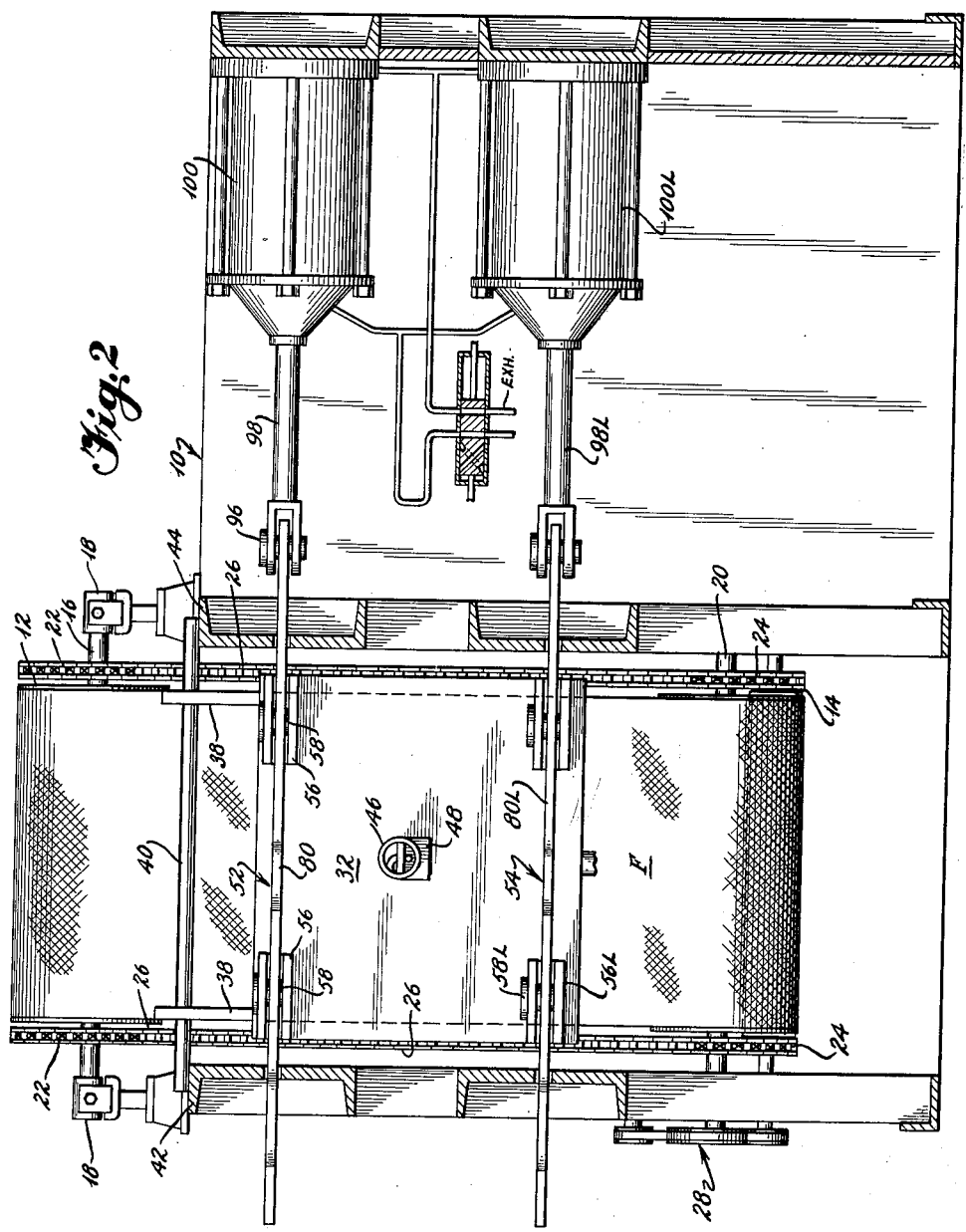
FIG. 2 is a cross sectional view of the filter head assembly of FIG. 1 taken on the line 2—2 of FIG. 1.

The filter head assembly shown in the drawings includes a suitably designed fixed framework designated generally 10 upon which an upper and a lower filter cloth roll, designated 12 and 14 respectively are mounted for rotation. Upper cloth roll 12 is mounted upon frame 10 by a central shaft 16 fixed to roll 12 and rotatably supported at either end in like bearing assemblies 18 which in turn are supported upon frame 10. Lower roll 14 likewise includes a central shaft 20 which is journaled at either end into portions of frame 10. An endless filter cloth F passes around the rolls 12 and 14.

Spaced from each end of upper roll 12 is a sprocket 22 fixed to shaft 16. A pair of similar sprockets 24 are fixedly secured to lower shaft 20 and a pair of like drive chains 26 are trained around upper and lower sprockets 22 and 24, one chain 26 being located at each side of filter cloth F.

Lower roll 14 is connected to be rotated by a suitable drive mechanism designated generally 28, rotary movement of lower roll 14 being transmitted by chains 26 to upper roll 12. It is believed apparent that upon rotary movement of the cloth carrying rolls, filter cloth F may be moved relative to the fixed frame 10.

Figure 3:
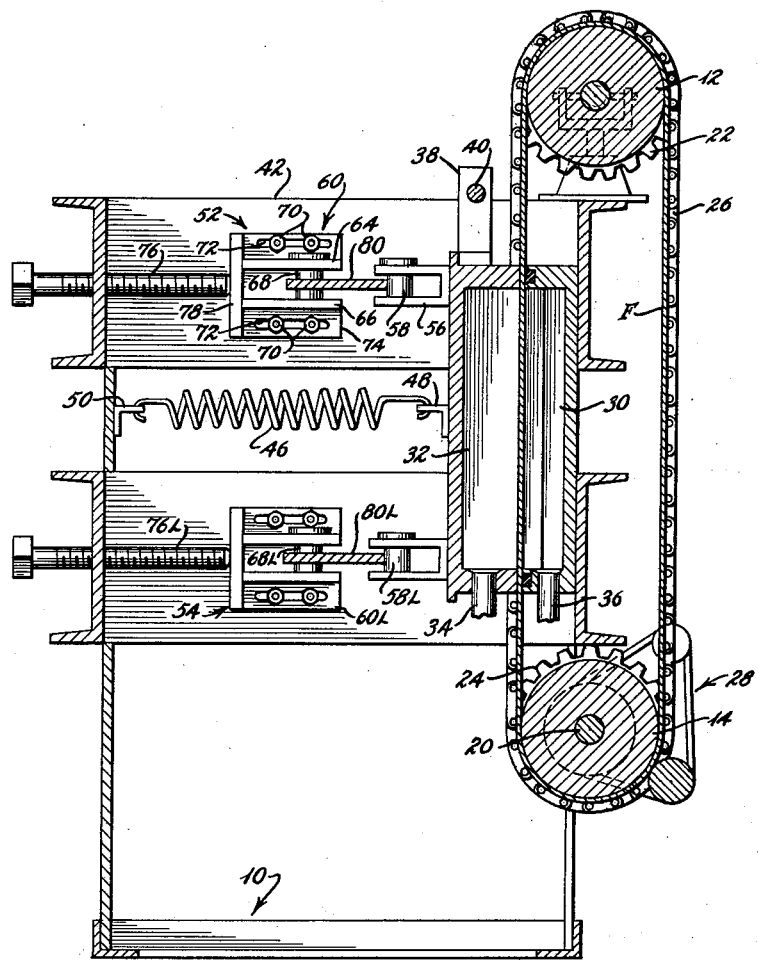
FIG. 3 is a cross sectional view of the filter head assembly of FIG. 1 taken on line 3—3 of FIG. 1.

The filter head of the assembly is defined by a pair of generally similar head elements 30 and 32. As best seen in FIG. 3, elements 30 and 32, when in the mating engagement shown in FIG. 3, define a closed filtering chamber. In the embodiment shown in the drawings head element 30 is fixedly secured to frame 10, as by welding, at a location where one run of endless filter cloth F overlies the open side of head element 30. When elements 30 and 32 are in the mating engagement of FIG. 3, the run of filter cloth F located between the elements 30 and 32 divides the chamber defined by mating elements 30 and 32 into two parts. That part of the chamber bounded by the interior of head element 32 and filter cloth F may be referred to as the pressure or inlet chamber of the filter head, while that portion of the chamber bounded by the interior of pressure head 30 and the opposite side of filter cloth F may be referred to as the suction or outlet chamber. Slurry to be filtered is introduced into the pressure or inlet chamber by means of an inlet conduit 34 while filtrate is discharged or drawn from the suction or outlet chamber through conduit 36.

Pressure head element 32 is supported upon frame 10 for movement toward and away from its mating head element 30 by a pair of upwardly projecting ears 38 which are welded to head 32 and bored adjacent their upper ends to rotatably receive a rod 40 which in turn is supported at its opposite ends upon a pair of spaced members 42 and 44 of fixed frame 10.

A coil spring 46 is connected in tension between a lug 48 welded to the back of head element 32 and a lug 50 welded to fixed frame 10. Spring 46 continuously biases head 32 away from mating engagement with head 30.

Pressure head 32 is moved to and positively maintained in the closed position shown in the drawings by means of upper and lower cam assemblies designated generally 52 and 54 respectively. Upper and lower cam assemblies 52 and 54 are of identical construction, therefore only upper cam assembly 52 will be described in detail, and common reference numerals will be employed to identify the corresponding parts of the respective upper and lower assemblies.

Upper cam assembly 52 includes a pair of like U shaped brackets 56 welded to the back of pressure head 32 at spaced positions with the legs of the brackets in aligned parallel relationship. Each bracket 56 supports a roller 58 in the form of a headed stud loosely received in aligned bores in the upper and lower legs of the respective brackets.

A second pair of brackets 60 and 62 are mounted upon fixed frame 10 in general vertical alignment with brackets 58. Bracket 60 includes spaced upper and lower plates 64 and 66 which are bored to loosely receive a stud 68 which functions as a roller in the same manner as stud 58 of brackets 56. Bracket 60 is mounted upon frame 10 by four bolts 70 which pass through a vertical wall of frame 10 and through elongated slots 72 in a side plate 74 of bracket 60. Elongated slots 72 permit bracket 60 to be moved toward or away from bracket 58 for reasons to be described below. It is believed apparent that bracket 60 may be clamped at selected positions by tightening bolts 70. To obtain a precise degree of adjustment of bracket 60 toward bracket 58, an adjusting screw 76 is threadedly engaged in frame 10 and abuts rear wall 78 of bracket 60. By threading adjusting screws 76 into frame 10, bracket 60 may be pushed toward the right in FIG. 3.

Bracket 62 is of identical construction with bracket 60 and differs therefrom primarily in the fact that it is arranged in the opposite hand from bracket 60 and is located somewhat more distant from head 32 than bracket 60. Bracket 62 will therefore not be described in detail. For convenience in the following description, the roller stud of bracket 62 corresponding to stud 68 of bracket 60 is identified as 68a.

An elongated cam 80 is positioned in edgewise engagement between rollers 58 and rollers 68, 68a. Referring to FIG. 1, cam 80 is formed with a straight edge 82 located in tangential engagement with both of rollers 58. The opposite side edge of cam 80 is formed with three parallel straight sections 84, 86 and 88. Sections 84, 86 and 88 are parallel to each other and to edge 82. Edge 86 is offset from edge 84 by a distance equal to the distance by which edge 88 is offset from edge 86. A curved edge section 90 connects edge 84 with edge 86 and a similar curved edge section 92 connects edge 86 with edge 88. The right hand (FIG. 1) end of cam 80 is formed with a transversely extending slot 94 through which a pin 96 is passed to couple cam 80 to the piston rod 98 of a pneumatic motor 100 mounted upon frame 10.

Lower cam assembly 54 is identical in construction to upper cam assembly 52. To avoid repetition the structure of lower cam assembly 54 will not be described in detail; in the drawings the reference numerals applied to upper cam assembly 52 are applied to lower cam assembly 54 with the addition of a subscript "L."

Operation of the assembly is as follows. As shown in the drawings, head elements 30 and 32 are in mating engagement and this relationship will be referred to as the closed position of the head assembly. To move the head assembly to its open position, the pneumatic motors 100 and $100_L$ of upper and lower cam assemblies 52 and 54 are simultaneously actuated to retract their respective piston rods 98 and $98_L$ from the fully extended position shown in the drawings. Both cam assemblies operate in the same direction at the same time, hence operation of upper cam assembly 52 will be described with the understanding that similar movements simultaneously occur in lower cam assembly 54.

Referring now to FIG. 1, as piston rod 98 of upper cam assembly 52 is retracted into the cylinder of motor 100, pin 96 is pulled to the right in FIG. 1 and, by virtue of the engagement of pin 96 with the walls of slot 94, cam 80 is moved toward the right. No movement of head element 32 occurs until cam 80 has been moved a sufficient distance to the right to move curved edge sections 92 and 94 respectively into contact with rollers 68 and 68a. As curved edge sections 90 and 92 move to the right past the respective rollers 68, 68a, the thickness or width of the cam 80 between rollers 68, 68a and 58 is decreased. Spring 46 has sufficient tension to move head 32 away from filter cloth 26, thus forcing cam 80 in the same direction to maintain contact between roller 68 and curved edge sections 90 and 92. Slot 94 permits movement of cam 80 in this direction relative to pin 96.

When piston rod 98 is fully retracted into the cylinder of motor 100, edge section 86 is in contact with roller 68 while edge section 84 is in contact with the roller 68a. At this time head 32 is fully retracted to its maximum displacement from filter cloth F. With head 32 located away from head 30, the head assembly is said to be in its open position, and at this time the drive mechanism 28 may be actuated to position a fresh section of filter cloth F between head elements 30 and 32.

To return head 32 to the closed position, both motors 100 are simultaneously actuated to drive their piston rods 98 to the fully extended position. As curved edge sections 90 and 92 are moved to the left past the respective rollers 68, 68a, head 32 is forced into mating engagement with head 30. In essence, curved edge sections 90 and 92 act as wedges between frame 10 and pressure head 32 during the head closing operation while straight edge sections 82, 86 and 88 act to lock the head in its closed position. Because of the parallel relationship between edges 82, 86 and 88, the forces exerted on cam 80 when it locks the head closed do not exert any forces tending to move the cam as would be the case if the cam were wedge shaped.

The degree of firmness of the engagement between head elements 30 and 32 may be adjusted by positioning brackets 60 and 62 a greater or lesser distance away from head 30. As explained above, if the brackets are to be moved toward head 30 to increase the force of engagement between the head elements, bolts 70 are loosened and adjusting screws 76 are threaded into the frame to push brackets 60 and 62 toward stationary head element 30. When the brackets are located in the desired position, bolts 70 are tightened to firmly clamp the brackets in place.

While I have described but one embodiment of my invention, it will be apparent to those skilled in the art that the disclosed embodiment may be modified. Therefore, the foregoing description is to be considered exemplary rather than limiting and the true scope of my invention is that defined in the following claims.

I claim:

1. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means normally biasing said elements toward said open position, and cam means disposed between said frame and one of said elements for effecting relative movement of said elements from said open position to said closed position and for positively maintaining said head elements in said closed position.

2. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means normally biasing said elements toward said open position, cam means shiftable between a first position in engagement with said frame and one of said elements for effecting relative movement of said elements to said closed position and a second position disengaged from said one of said elements permitting said biasing means to effect relative movement of said elements to said open position.

3. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, an elongated cam supported between said frame and one of said head elements for movement between a first position and a second position, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section to force said one of said head elements to said closed position when said cam is in said second position.

4. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, an elongated cam supported between said frame and one of said head elements for movement between a first position and a second position, reversible motor means mounted on said frame for driving said cam between said first and said second positions, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section to force said one of said head elements to said closed position when said cam is in said second position.

5. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, an elongated cam supported between said frame and one of said head elements for movement between a first position and a second position, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section, and a curved edge section on said connecting one end of said first edge section to the adjacent end of said second edge section to force said one of said head elements to said closed position when said cam is moved from said first to said second position.

6. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, an elongate cam supported between said frame and said one of said head elements for movement between a first position and a second position, reversible motor means mounted on said frame for driving said cam in movement between said first and said second positions, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section, and a curved edge section on said connecting one end of said first edge section to the adjacent end of said second edge section to force said one of said head elements to said closed position when said cam is moved from said first to said second position.

7. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means normally biasing said elements toward said open position, cam means supported from said frame for movement between a first and a second position, and means for shifting said cam means to said first position to engage one of said head elements and maintain said head elements in said closed position and to said second position to disengage said one of said head elements and permit the same to be moved away from the other of said head elements by said biasing means.

8. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means biasing said elements to said open position, an elongated cam supported between said frame and one of said head elements for movement between a first position and a second position, said cam having a straight first edge engageable with said one of said head elements, a second edge on said cam opposite said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section to force said one of said head elements to said closed position when said cam is in said second position.

9. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means biasing said elements to said open position, an elongated cam supported between said frame and one of said head elements for movement between a first position and a second position, reversible motor means mounted on said frame for driving said cam between said first and said second positions, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section to force said one of said head elements to said closed position when said cam is in said second position.

10. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means biasing said elements to said open position, an elongated cam supported between said frame and one of said head elements for movement between a first position and a second position, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section, and a curved edge section on said connecting one end of said first edge section to the adjacent end of said second edge section to force said one of said head elements to said closed position when said cam is moved from said first to said second position.

11. A filter head assembly comprising a frame, a pair of mating filter hea delements, means mounting said head elements on said frame for movement relative to each other between an open position wherein said elements are spaced from each other and a closed position wherein said elements are in mating engagement with each other to co-operatively define a filtration chamber, means biasing said elements to said open position, an elongate cam supported between said frame and said one of said head elements for movement between a first position and a second position, reversible motor means mounted on said frame for driving said cam in movement between said first and said second positions, said cam having a straight first edge engageable with said one of said head elements, a second edge on said cam opposite said first edge and including a first edge section parallel to said first edge and engageable with a portion of said frame when said cam is in said first position, a second edge section on said second edge parallel to said first edge and engageable with said portion of said frame when said cam is in said second position, said second edge section being spaced a greater distance from said first edge than said first edge section, and a curved edge section on said connecting one end of said first section to the adjacent end of said second edge section to force said one of said head elements to said closed position when said cam is moved from said first to said second position.

12. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, roller means mounted on said frame and on one of said head elements in spaced opposed relationship, cam means disposed between the opposed roller, and means for shifting said cam means to drive said one of said head elements toward the other of said head elements to locate said head elements in said closed position.

13. A filter head assembly comprising a frame, a pair of mating filter head elements, means mounting said head elements on said frame for movement relative to each other between an open position wherein said elements are spaced from each other and a closed position wherein said elements are in mating engagement with each other to co-operatively define a filtration chamber, means biasing said elements to said open position, roller means mounted on said frame and on one of said head elements in spaced opposed relationship, cam means disposed between the opposed roller, and means for shifting said cam means in one direction to drive said one of said head elements toward the other of said head elements to locate said head elements in said closed position and in the other direction to permit said biasing means to move said one of said elements away from the other of said elements to said open position.

14. A filter head assembly comprising a frame, a first head element fixedly mounted upon said frame, a second head element adapted to mate with said first head element to define a filtration chamber therewith, means mounting said second head element on said frame for movement toward and away from mating engagement with said first head element, means normally biasing said second head element away from said first head element, and cam means disposed between said second head element and said frame for releasably maintaining said second head element in positive mating engagement with said first head element against the action of said biasing means.

15. A filter head assembly comprising a frame, a first head element fixedly mounted upon said frame, a second head element adapted to mate with said first head element to define a filtration chamber therewith, means mounting said second head element on said frame for movement toward and away from mating engagement with said first head element, an elongated cam element having opposite edges respectively engaged with said second head element and said frame, said cam having a first section wherein said edges are relatively close to each other and a second section wherein said edges are relatively distant from each other, means biasing said second head element toward said frame to maintain said head element and said frame in respective engagement with the opposite edges of said cam element, and means for selectively positioning said first or said second section of said cam between said frame and said second head element.

References Cited in the file of this patent
UNITED STATES PATENTS

| | | |
|---|---|---|
| 920,909 | Brewer | May 11, 1909 |
| 2,648,234 | Lester | Aug. 11, 1953 |
| 2,867,326 | Hirs | Jan. 6, 1959 |